Jan. 1, 1935.   H. W. SANFORD   1,986,120
RAIL TRANSIT APPLIANCE FOR ROAD VEHICLES
Filed Jan. 26, 1933   2 Sheets-Sheet 1
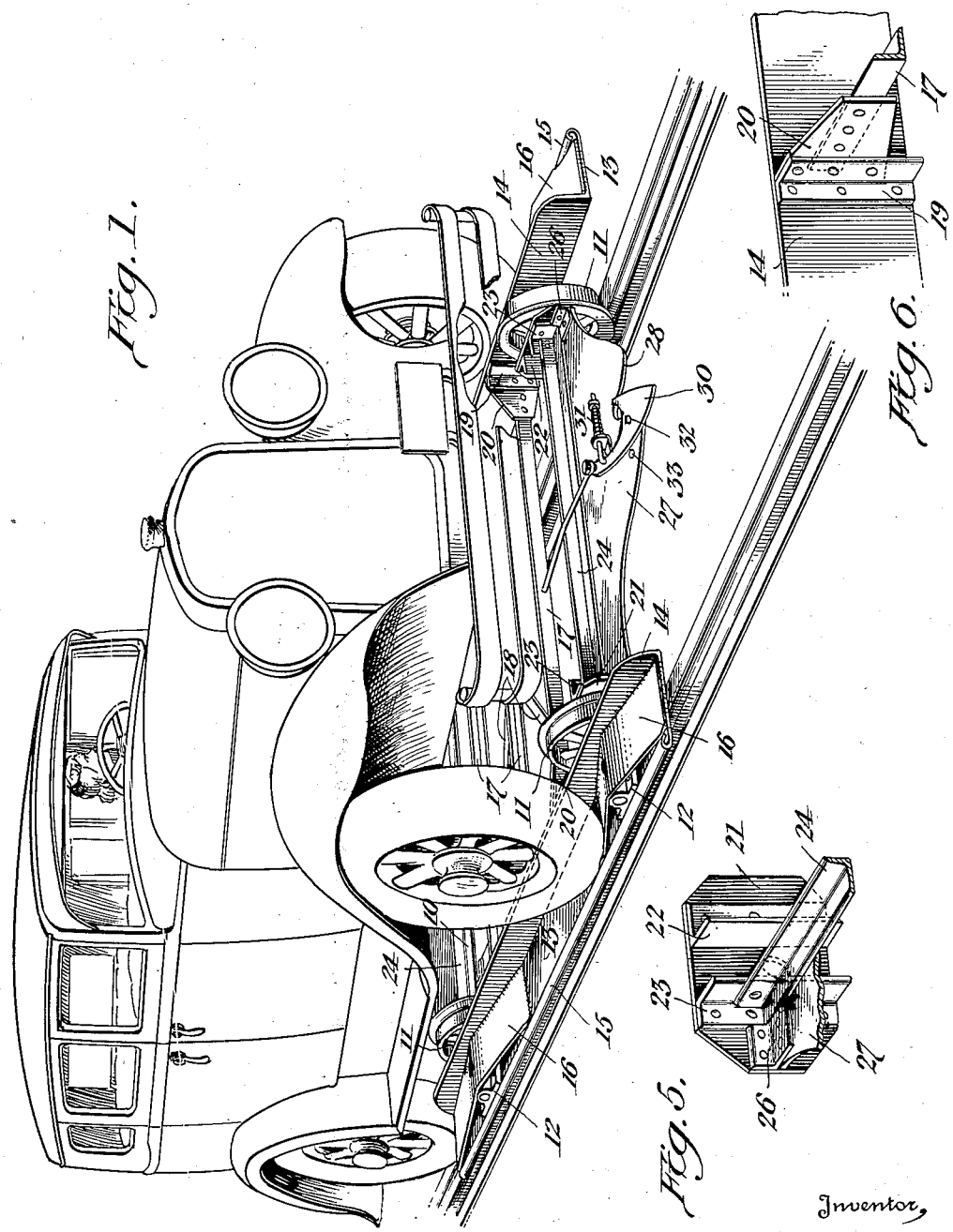

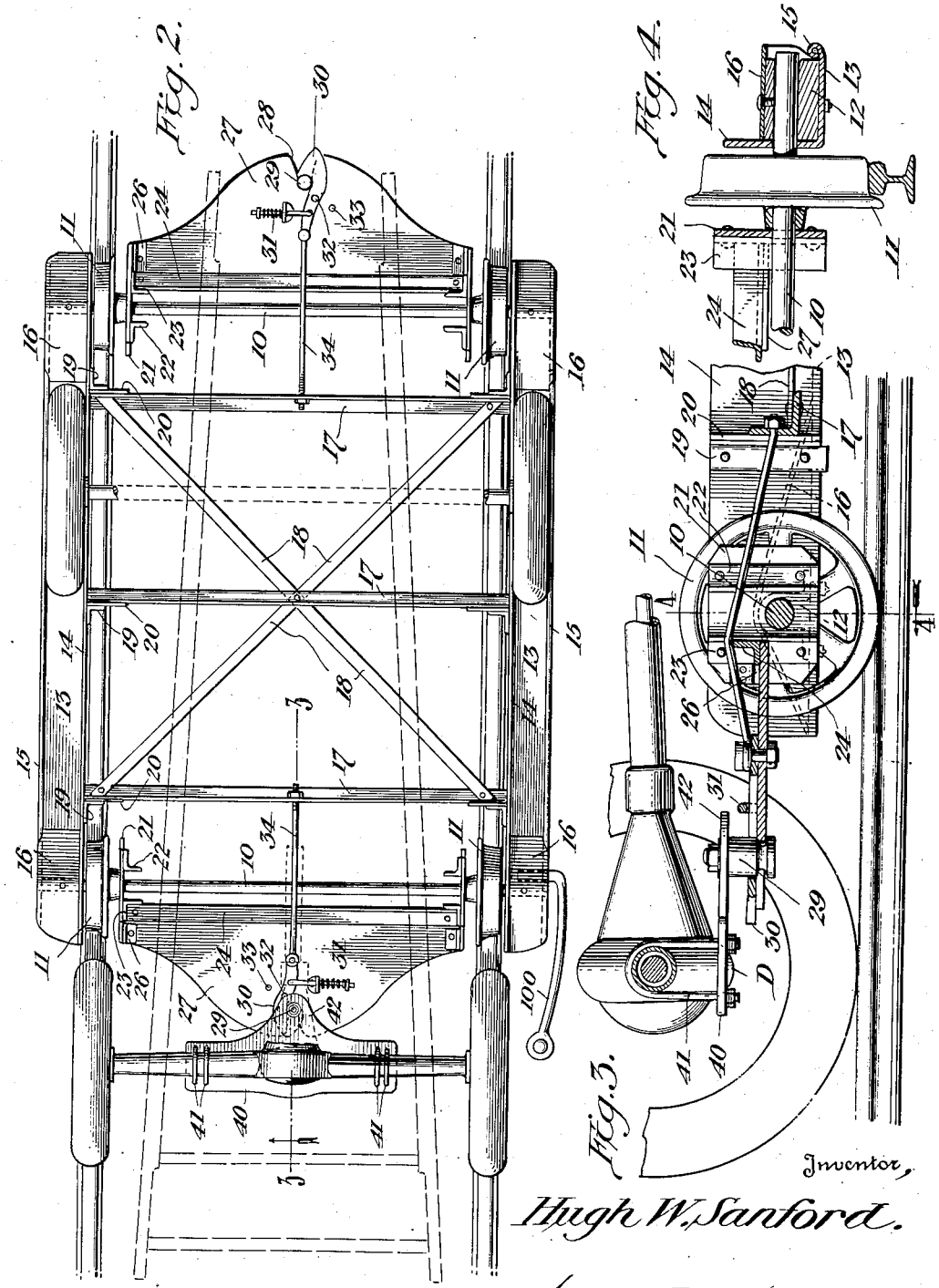

Patented Jan. 1, 1935

1,986,120

UNITED STATES PATENT OFFICE 1,986,120

RAIL TRANSIT APPLIANCE FOR ROAD VEHICLES

Hugh W. Sanford, Knoxville, Tenn.

Application January 26, 1933, Serial No. 653,706

13 Claims. (Cl. 105—159)

This invention relates to improvements in rail transit appliances which are particularly adapted for employment with road vehicles of the automotive type, whereby the power of the automotive vehicle is employed during rail transit.

One of the features of the present invention is the provision of a simple appliance adapted to travel on rails and support a road vehicle with its driving wheels associated with the rails whereby the power plant of the automotive vehicle is employed for its propulsion along the rails, and its brakes may be employed for stopping.

Another feature of the present invention is the provision of such a construction, in which the rail appliance has an extremely low center of gravity and provides supports for association with the road vehicle which maintain the center of gravity of the assembled appliance and vehicle at a low point.

A further feature of the present invention is the provision of a rail appliance for employment with a road vehicle, in which the appliance and vehicle are provided with interengaging means for maintaining the road vehicle in proper transverse alignment, and for preventing relative longitudinal movement.

Further features of the invention relate to details of construction, including means for securing the appliance and vehicle together, as will appear in the course of the following specification and claims, in conjunction with the illustrative showing of the accompanying drawings, in which:

Figure 1 is a perspective view showing a rail appliance of the present nature, with a road vehicle mounted thereon ready for rail transit.

Figure 2 is a plan view of the rail appliance, with the road vehicle wheels and rear axle shown in position, other parts of the road vehicle being broken away or shown in dotted lines for clearness.

Figure 3 is a longitudinal upright sectional view substantially on line 3—3 of Figure 2.

Figure 4 is a transverse upright sectional view substantially on line 4—4 of Figure 3.

Figures 5 and 6 are details of the assembly of the rail appliance.

In the drawings, the road vehicle is illustrated as an automobile, in which the rear tires are of a track gauge corresponding to the gauge of the rails upon which the appliance is to travel, so that these tires may be employed for the delivery of power from the engine of the automobile for movement along the rails, and the brakes of the automobile may be employed for stopping the assembly.

In the particular form illustrated, the front wheels of the automobile are of different gauge from the rear wheels so that it is unnecessary to run the front wheels of the road vehicle over the tops of the rail wheels in bringing the vehicle into the desired position upon the rail appliance. In particular, the specific form shown has the front wheels of the vehicle of wider gauge than the track gauge, and the front wheel supporting surfaces are located laterally outside the flanged wheels of the rail appliance.

When the road vehicle is supported on and held to the rail appliance, the flanged wheels of the rail appliance will operate in the normal manner during passage along the track, and the combination of appliance and road vehicle will move past frogs, switches and turnouts without difficulty, as the flanged wheels of the rail appliance guide the combination, and the vehicle tires have no difficulty in traveling along the tops of the rails, over switches and frogs, etc., in following the rail wheels.

The rear wheels of the vehicle trail the rear flanged wheels of the appliance closely, and the maintained longitudinal and transverse alignment in the combination keeps the vehicle tires in position on the rails even during transit around curves of short radius.

The track appliance comprises the axles 10 having the flanged rail wheels 11 thereon, and mounted upon bearings 12 which are shown as rigidly fixed to the tread portions 13 of lateral gutters which include the upright inner walls 14 and the outer curled edges 15, these gutters being intended to receive the front wheels of the automobile and support them closely adjacent the upper or bearing surface of the rails. To this end, the axles are located above the floors 13. Ramps 16 are provided at the ends of the floors 13 and have inclines for assisting the movement of the front wheel over the rearward axle of the rail appliance while the automobile is being brought onto or removed from the rail appliance. The ramps 16 are preferably secured to the bearings 12, the floors 13 and the walls 14 rigidly, as by welding.

The two gutters are supported at a proper distance apart and stiffened against yielding under load by the transverse angle ties 17, and the entire assembly is supported against departing from the intended road angle position of parts by diagonal braces 18. As shown in Figure 6, the vertical walls 14 are provided with vertical angle pieces 19 to which the transverse angle ties 17 are secured, and gusset plates 20 are employed for stiffening the structure.

Pivotally mounted upon each axle are the pressure plates 21 which are illustrated as being located in longitudinal upright planes, and stiffened by upright angle irons 22, 23. The angle irons 23 are connected by a cross tie 24 which supports the pressure plates at a predetermined relative transverse position. The pressure plates 21 are likewise provided with the small horizontal angles 26. The vehicle-engageable plates 27 are provided at each end of the appliance for engagement with the vehicle, so that the vehicle may be positively connected to the appliance while associated therewith. For this purpose, each plate 27 has a notch 28 formed at the end of the appliance for the reception, as will be described hereinafter, of a pin 29 supported by the vehicle. Pivoted on the plate is a hook 30 for engaging the pin 29 and holding it in the notch so that the forward and backward movement of the vehicle is accompanied by a corresponding movement of the rail appliance. A spring 31 operates between the plate 27 and the hook 30 to draw the hook into holding relationship; and the hook is provided with an aperture 32 for the reception of a locking means whereby to prevent accidental disengagement of the hook from the pin 29; or for holding the hook in open position. For the latter purpose, small apertures 33 are provided in the plate 27 itself.

The structure, including the vehicle-engaging plate 27 and the pressure plates 21, is held at a proper elevation for engagement by the pin 29 through a brace rod 34 which has a threaded end passed through the transverse tie rod 17 for engagement with an adjusting nut whereby to control the angular position of the pressure plates 21 with respect to the axle 10.

In the illustrated form of construction, the vehicle is shown as having a plate member 40 secured beneath the rear axle by U-bolts 41 and having a forward extension 42 provided with the downwardly extending pin 29 (Figure 3), which is illustratively shown as having a groove adjacent its lower end which is of substantially the same diameter as the innermost portion of notches 28, while the general peripheral surface of the pin 29 is of greater dimension. In this way relative upward and downward movements of the vehicle and appliance do not result in separations of the pin 29 and plate 27. In order to steady the plate 40 in position, it is illustrated as having an opening for the reception of the lower portion D of the vehicle differential (Figure 3).

In operation, the rail appliance is placed on rails passing along a city street or adjacent a crossing or other point where the space between the rails is substantially filled to the rail level. The automobile is driven parallel to the rails. The appliance is held against movement along the rails. As the automobile comes to the appliance, its front wheels mount upon the ramps 16 and are guided by the vertical walls 14. The rear wheels travel over the rails until the pin 29 approaches and enters the notch 28, repressing the hook 30 and entering the base of the notch. The hook 30 then engages automatically by spring 31 and may further be secured in position by the locking pin as described above.

According to the length of the wheel base of the vehicle, the front wheels may be located at one or another point of the longitudinal length of the gutter surface 13, either between the rams or even upon the forward ramp.

The blocking device which has been retaining the rail appliance against movement along the rails,—shown illustratively in Figure 2 as a releasable hook 100 which may be engaged between the ramp 16 and the floor 13,—is withdrawn and the vehicle and appliance are now assembled and competent of travel along the rails. The engagement of the pin 29 in notch 28 affords an assurance of the definite transverse alignment so that the rear tires remain upon the rails. By reason of the closeness of these rear tires to the adjacent wheels 11 of the rail appliance, this relationship continues even during passage around the sharpest curves in railroad practice.

The power plant of the automobile is employed for its own propulsion, and the braking system of the automobile for stopping the assemblage. It will be noted that a large area of rubber is thus presented for the frictional engagement necessary for driving or braking, and that this occurs directly and without intermediation.

Upward and downward relative movements of the vehicle and rail appliance do not result in the separation of them.

Upon arriving at the rail destination, the locking pin (if employed) is released and the hook 30 pulled away from the notch 28. The automobile is then backed off the rail appliance and is again ready for road transportation in the normal way.

It is obvious that the invention is not limited to the illustrative form of construction shown, but that it may be modified in many ways within the scope of the appended claims.

Having thus described the invention, what I claim as new and desire to secure by Letters Patent, is:

1. A rail transit appliance for a road vehicle, said vehicle having at least one driving road wheel and a second road wheel, comprising flanged wheels for engaging the rails, means carried by said flanged wheels for supporting the second road wheel and including a surface along which the second road wheel may be rolled in bringing the vehicle into position for transit on said appliance, and means connected with said supporting means for holding said driving road wheel upon one of said rails so that driving can be effected by the direct engagement of the road wheel with the rail.

2. A rail transit appliance for a road vehicle, said vehicle having at least one driving and braking road wheel and a second road wheel comprising flanged wheels for engaging the rails, means carried by said flanged wheels for supporting the second road wheel and including a surface along which the second road wheel may be rolled in bringing the vehicle into position for transit on said appliance, and means connected with said supporting means for holding said driving road wheel upon one of said rails so that driving and braking can be effected by the direct engagement of the road wheel with the rail.

3. A rail transit appliance for a road vehicle, said vehicle having a rear wheel gauge equivalent to the track gauge, comprising a pair of spaced members for providing reception and support surfaces for the front wheels of the vehicle and onto and along which the wheels may be rolled in bringing the vehicle into position for transit with said appliance and including non-horizontal walls for guiding and retaining the wheels against lateral movement relative to the appliance, flanged wheels for engaging the rails and connected to said members, and means on said appliance for cooperatively engaging the vehicle and holding the rear vehicle wheels upon the rails by preventing relative transverse movement thereof.

4. An appliance as in claim 3, in which axles are provided for said wheels and located above the support surfaces, and ramps extend from said surfaces over said axles to permit the movement of the front wheels over and past the axles.

5. An appliance as in claim 3, including axles for said wheels located above the support surfaces, bearings connected to said members for supporting said axles, and ramps extending from the support surfaces over said bearings.

6. A rail transit appliance for a road vehicle, said vehicle having a rear wheel gauge equivalent to the track gauge, comprising a pair of spaced members for providing reception and support surfaces for the front wheels of the vehicle and onto and along which the wheels may be rolled in bringing the vehicle into position for transit with said appliance and including non-horizontal walls for guiding and retaining the wheels against lateral movement relative to the appliance, bracing means for connecting said members, flanged wheels for engaging the rails and connected to said members, and means on said appliance for cooperatively engaging the vehicle and holding the rear vehicle wheels upon the rails by preventing relative transverse movement thereof.

7. A rail transit appliance for a road vehicle, said vehicle having a rear wheel gauge equivalent to the track gauge and having a downwardly extending element, comprising a pair of spaced members for providing reception and support surfaces for the front wheels of the vehicle and onto and along which the wheels may be rolled in bringing the vehicle into position for transit with said appliance and including non-horizontal walls for guiding and retaining the wheels against lateral movement relative to the appliance, bracing means for connecting said members, flanged wheels for engaging the rails, and means on said appliance for cooperatively engaging said downwardly extending element and thereby holding the rear vehicle wheels upon the rails and in substantially rigid relationship with the rail appliance.

8. An appliance as in claim 7, in which said cooperative means includes a substantially horizontal plate having a notch at the end of the appliance for receiving said member, and a securing device for holding said member in said notch.

9. An appliance as in claim 7, in which said cooperative means includes a plate mounted on a horizontal axis and having a notch at the end of the appliance to receive said member, a securing device for holding said member in said notch, and means on the appliance for holding said plate with said notch in position for receiving said member.

10. A rail transit appliance for a road vehicle, said vehicle having a rear wheel gauge equivalent to the track gauge, comprising a pair of spaced members for providing reception and support surfaces for the front wheels of the vehicle and including non-horizontal walls for guiding and retaining the front wheels against lateral movement relative to the appliance, bracing means for connecting said members, flanged wheels for engaging the rails and connected to said members, and a pair of substantially horizontal plates, said plates being located at the ends of the appliance, each having an open notch for receiving and cooperatively engaging a part of the vehicle and thereby holding the rear wheels of the vehicle upon the rails by preventing the relative transverse movement thereof, and individual means associated with each said plate for holding the vehicle part engaged in said notch.

11. A rail transit appliance for a road vehicle, said vehicle having a rear wheel gauge equivalent to the track gauge and the front wheel gauge differing from the track gauge, comprising a structure having flanged wheels for travel along the rails, supporting means on the structure for the front wheels of the vehicle transversely spaced with relation to the rails and including surfaces onto and along which the front wheels may be rolled in bringing the vehicle into position for transit with said appliance, said surfaces being transversely spaced with respect to the rails and flanged wheels so that the flanged wheels do not interfere with bringing the vehicle into and out of transit position, and means on the structure located close to two of the flanged wheels of said appliance for cooperatively engaging said vehicle for preventing relative longitudinal movements of said vehicle and appliance and for maintaining said rear vehicle wheels on top of the rails and close to said two flanged wheels, whereby the power mechanism of the vehicle may propel the rail appliance with the vehicle held thereto.

12. A rail transit appliance for a road vehicle, said vehicle having a rear wheel gauge equivalent to the track gauge and the front wheel gauge wider than the track gauge, comprising a structure having flanged wheels for travel along the rails, supporting means on the structure for the front wheels of the vehicle located laterally outside the flanged wheels and including surfaces onto and along which the front wheels may be rolled in bringing the vehicle into position for transit with said appliance, said surfaces being transversely spaced with respect to the rails and flanged wheels so that the flanged wheels do not interfere with bringing the vehicle into and out of transit position, and means on the structure located close to two of the flanged wheels of said appliance for cooperatively engaging said vehicle for preventing relative longitudinal movements of said vehicle and appliance and for maintaining said rear vehicle wheels on top of the rails and close to said two flanged wheels, whereby the power mechanism of the vehicle may propel the rail appliance with the vehicle held thereto.

13. A rail transit appliance for an automotive road vehicle, comprising a structure having flanged wheels for travel along the rails, and means for holding the vehicle against relative lateral and longitudinal movement on said structure with its driving wheels upon the rails, said holding means including supporting devices for the front wheels of the vehicle onto and along which the front wheels may be moved by the vehicle power.

HUGH W. SANFORD.